Nov. 18, 1952 E. M. PARKER 2,618,311
MANUFACTURE OF LAMINATED FURRING NAIL SPACERS
Filed Oct. 27, 1950 2 SHEETS—SHEET 1
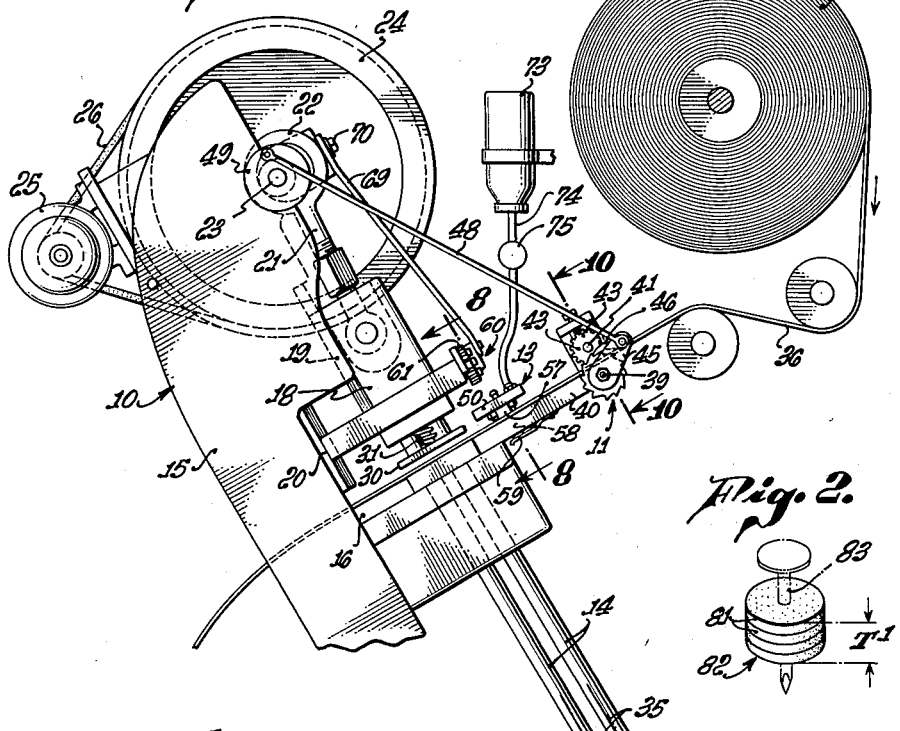
Edward M. Parker,
INVENTOR.
BY [signature]
ATTORNEY.

Nov. 18, 1952 — E. M. PARKER — 2,618,311
MANUFACTURE OF LAMINATED FURRING NAIL SPACERS
Filed Oct. 27, 1950 — 2 SHEETS—SHEET 2
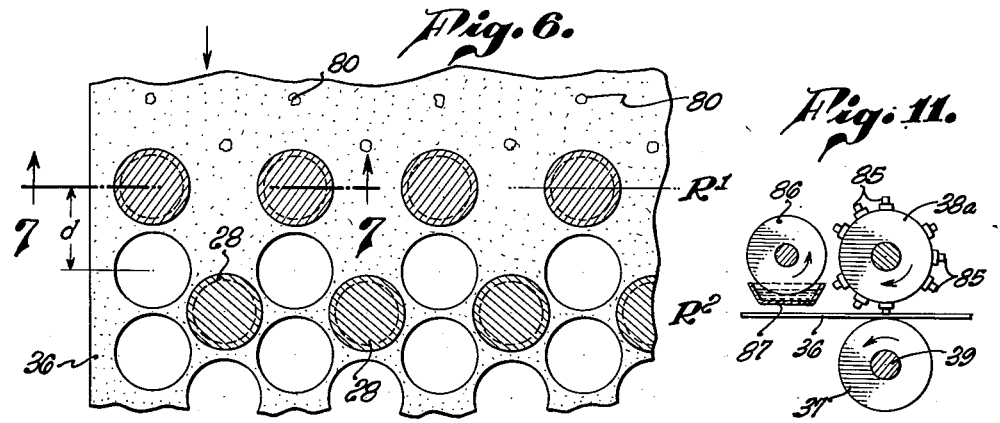
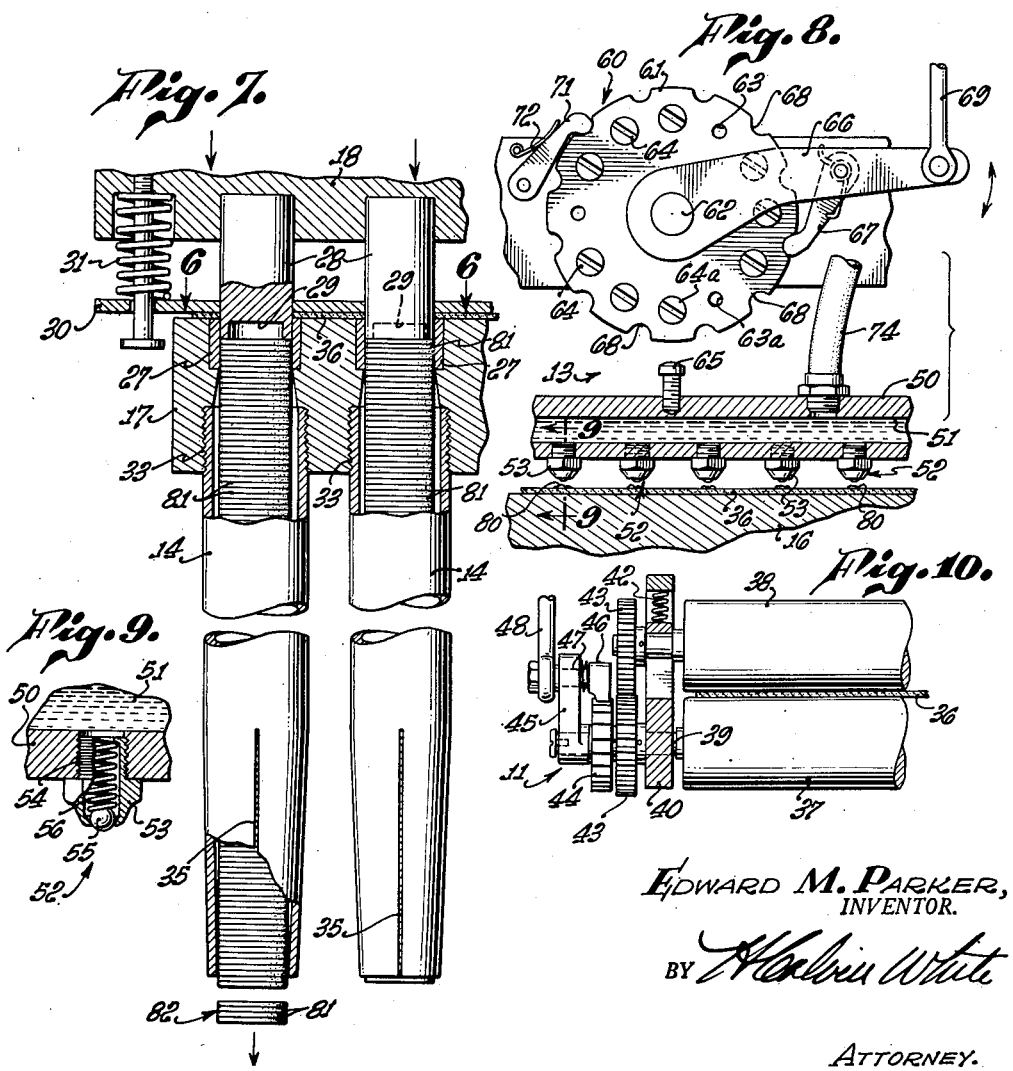
Edward M. Parker, INVENTOR.
BY [signature]
ATTORNEY.

Patented Nov. 18, 1952

2,618,311

UNITED STATES PATENT OFFICE 2,618,311

MANUFACTURE OF LAMINATED FURRING NAIL SPACERS

Edward M. Parker, Rialto, Calif., assignor to Parklip, Inc., Los Angeles, Calif., a corporation of California Application October 27, 1950, Serial No. 192,466

16 Claims. (Cl. 154—1)

This invention relates to the manufacture of laminated members or disks particularly adapted for use as spacers for furring nails.

It has heretofore been the practice, in forming spacers for furring nails, to punch them directly from a relatively thick sheet of asphalt impregnated felt or similar material. However, though the spacers produced in this manner have been generally satisfactory for their intended purpose, this process has resulted in a considerable waste of material, with the result that the ultimate selling price of the nails has had to be high enough to compensate for that waste. As an example, when spacers having a diameter of ⅝ of an inch are punched with maximum material efficiency from a sheet of material ⅜ of an inch thick and say 6 inches wide, the percentage of the sheet which is left in the perforated web of waste material at the completion of the punching process is approximately 45 percent.

The general object of the present invention is to provide improved methods and apparatus for manufacturing laminated members usable as furring nail spacers, and particularly to provide for a material reduction in waste during the formation of such spacers and therefore in the cost of the finished nails. This result is achieved by a unique method of manufacture according to which a plurality of relatively thin disks or elements are separately punched from a thin sheet of material and are then secured together, preferably by an adhesive, after the punching process. Since, the width of waste material left between adjacent punchings during any punching process is directly dependent upon the thickness of the material being punched, the percentage of material wasted in producing a predetermined number of spacers of a given size and thickness from thin material, as in the present invention, is substantially less than under conventional methods, employing thicker materials.

More specifically, as is well known in the punching art, the width of the waste material between adjacent punchings in a sheet must be at least as great as the thickness dimension of the sheet. Consequently, when a number of discs are first separately punched from thin material and then secured together after their formation, as in the present invention, the web of waste material at its narrowest point need be only as wide as the relatively small thickness dimension of the material. On the other hand, in using thicker material, the waste web must at all points be wider and the punchings farther apart in correspondence with the increased thickness of the material. To indicate the importance of this factor, when laminated furring nail spacer disks measuring ⅝ of an inch in diameter and ⅜ of an inch in thickness are formed according to the present invention from strip material 6 inches wide and $\frac{1}{16}$ of an inch thick, the percentage of waste is reduced from the usual 45 percent wasted in making the same size spacer according to conventional methods to approximately 24 percent, with a corresponding reduction in the cost of the product to the public. An added important advantage of the punching of a number of disk portions from relatively thin material, as against the punching of a disk from thicker material, resides in the greater facility in handling such thinner material and particularly in its capacity for being handled and fed to a punching and gluing machine in rolls rather than in flat sheets.

A further object of the invention is to provide a method and apparatus for securing a number of disks or elements together in an extremely inexpensive and simple manner such that the economic advantages of the above reduction in waste are not in any way diminished. Preferably, this result is achieved by a process according to which an adhesive is first applied to a sheet of material at spaced locations, disks are then punched from the portions of the sheet to which the adhesive has been applied, and the disks are then retained together in a face to face stack or series so that the adhesive upon drying integrates them into a single laminated spacer. For maximum efficiency, all of the disks punched by a single punching element may be retained in a continuous stack, with glue being applied to only predetermined ones of the disks, so that when retained in their stacked relation the disks are automatically integrated into groups each comprising a predetermined number to thus form laminated spacers of a given thickness.

The adhesive may be applied to the disks in proper sequence by mechanism operating in predetermined timed relation to the punching apparatus. In one form of the invention, this mechanism includes an adhesive applying unit mounted for reciprocal movement into and out of engagement with the sheet of material and operable upon each engagement with the sheet to locally deposit glue at a location subsequently to be punched. This movable adhesive applying unit may be actuated by a control mechanism carried by and movable with the punch holder of the punching mechanism. In a second form of the invention, the adhesive is applied to the sheet material by means of a roller having projections to which adhesive is fed and which transfer the adhesive to the material as it passes the roller.

To retain the individual punched elements or disks together as the glue dries, I may employ an elongated tube into which the disks are discharged after being punched and which is specially formed to retard the passage of disks in a manner retaining them in closely stacked relation. Such retarding of the disks may be effected by forming a portion of the tube to be slightly restricted, as by longitudinally slitting its discharge end and then radially constricting that slit portion.

The above and other features and objects of the present invention will be better understood from the following detailed description of the typical embodiments illustrated in the accompanying drawings in which:

Fig. 1 is a side view of a machine for forming laminated spacer disks for furring nails;

Figs. 2 and 3 are perspective views of furring nails formed according to the present invention;

Fig. 4 is a perspective view of the perforated web of waste material left after the punching of spacer disks from a thick sheet of material in the conventional manner;

Fig. 5 is a perspective view of the perforated sheet of waste material left after the manufacture of spacers in accordance with the present invention;

Fig. 6 is an enlarged fragmentary horizontal section through the mechanism of Fig. 1 taken during the punching process and at the upper surface of the sheet of material from which the disks are formed;

Fig. 7 is a section through the punching and disk discharge portions of the apparatus taken on line 7—7 of Fig. 6;

Fig. 8 is an enlarged fragmentary section through the glue dispensing apparatus and taken on line 8—8 of Fig. 1;

Fig. 9 is a fragmentary further enlarged section through one of the glue discharge valves and taken on line 9—9 of Fig. 8;

Fig. 10 is an enlarged fragmentary sectional view through the material feeding rollers and taken on line 10—10 of Fig. 1; and Fig. 11 is a variational form of glue applying mechanism.

Referring first to the general showing of Fig. 1, the apparatus there shown includes a conventional punch press 10 to which a sheet of material 36 is fed from a supply roll 12 by an intermittent feed mechanism 11. This sheet material is preferably composed of asphalt impregnated felt such as is conventionally used in furring nail spacers. Glue is applied to the material prior to the punching process by a glue dispensing unit 13 operable by an actuating mechanism 60. The individual disks 81 formed by the punch press are retained together in stacked relation after the punching operation by restricted discharge tubes 14, so that as the glue dries it integrates the individual disks into laminated spacers of the types shown at 82 and 82a in Figs. 2 and 3. Nails 83 are then driven axially through these laminated spacers to form the complete furring nails.

Punch press 10 is typically shown as comprising the usual upstanding frame 15 carrying a work supporting structure or table 16 in which is mounted a die holder 17. The usual punch holder 18 is mounted to frame 15 above die holder 17 for generally vertical movement toward and away from the die holder. The punch holder is guided for such movement by dove-tailed engagement with the frame at 19 and by sliding bearing engagement at 20. The punch holder is driven by a connecting rod or link 21 having an upper annular portion 22 eccentrically and rotatably mounted about drive shaft 23. This shaft carries at one end a fly wheel 24 driven by an electric motor or other power source 25 through belt 26. During operation of the machine, motor 25 continuously drives fly wheel 24 and shaft 23 to reciprocate punch holder 18 toward and away from die holder 17.

As best seen in Fig. 7, die holder 17 carries in its upper surface a number of tubular die elements 27 into which cylindrical punches 28 carried by punch holder 18 are receivable upon downward movement of the punch holder. The lower ends of punches 28 contain upwardly extending recesses 29 to avoid engagement of the punches upon a punching operation with the glue previously applied to the sheet material. The usual stripper plate 30 is movably carried by the punch holder and is urged downwardly by spring 31 to remove the web of waste material from the punches after a punching operation.

The various disks 81 successively formed by each of the punches 28 pass downwardly from the corresponding tubular die element 27 into an associated discharge tube 14 whose upper end is threaded into the die holder at 33 and which extends downwardly to direct the disks into a collecting pan 34. The lower ends of discharge tubes 14 have a number of longitudinal slits 35 and are constricted just sufficiently to retard the downward movement of the disks and retain them together in stacked relation as shown while the glue dries. Preferably, tubes 14 are formed of resilient material so that their lower split portions are resiliently expansible and exert a yielding force against the disks.

Fig. 6, taken at the upper surface of the sheet of material 36 during a punching operation, represents the preferred arrangement of punches and their punching pattern. Specifically, it is noted that the punches are arranged in two rows R1 and R2 extending transversely of the path of the material through the machine, and the individual punches are relatively staggered as between these two rows. Rows R1 and R2 are spaced as shown to punch alternate rows of disks from the sheet. The sheet of material is advanced the distance d of Fig. 6 between successive actuations of the punching mechanism.

The mechanism 11 for feeding material 36 to the punching apparatus includes a pair of opposed transverse rollers 37 and 38 located beneath and above the material, respectively (see Fig. 10), and which are intermittently rotated to advance the material through the distance d of Fig. 6. The lower roller 37 is rigidly carried by a shaft 39 suitably journaled at its opposite ends in a pair of fixed bearings 40. The upper roller 38 is similarly carried by a shaft 41 suitably guided for slight vertical adjusting movement toward and away from roller 37 and urged downwardly toward roller 37 by springs 42. Shafts 39 and 41 project beyond their corresponding bearings at one end to carry meshing gears 43 by which rotation is transmitted from roller 37 to roller 38. Outwardly beyond gears 43, shaft 39 of the lower roller rigidly carries a ratchet wheel 44 by which the shaft and rollers are driven. Adjacent ratchet wheel 44, shaft 39 carries a swinging arm 45 to the outer end of which is movably mounted a pawl 46 engageable with the teeth of ratchet wheel 44 and urged against the ratchet wheel by spring 47. The outer end of arm 45 is pivotally connected to the lower end of a link or rod 48, whose other end is pivotally connected at an eccentric location to a wheel 49 carried and driven by the main shaft 23 of the punch press. Rotation of wheel 49 thus alternately retracts pawl 46 in a clockwise direction (as seen in Fig. 1) about ratchet wheel 44, and then advances the pawl in a counterclockwise direction. Such counterclockwise advancement of the pawl actuates the ratchet wheel in a manner rotating rollers 37 and 38 to advance material 36 the predetermined distance d.

The glue dispensing unit shown in Figs. 1 and 8 includes a glue distributing header 50 extending transversely across the path of the material 36 between the locations of the material feeding mechanism 11 and the location of punches 28. Header 50 contains an inner transverse glue passage 51 and carries a number of discharge valves 52 connected into the underside of the header. Each of these discharge valves includes a tubular body 53 (see Fig. 9) threadedly connected into the bottom wall of the header at 54 and containing a ball valve 55 at its lower end normally pressed downwardly to a closed condition by coil spring 56. Ball 55 projects downwardly beneath the lower end of body 53 so that engagement of the ball with material 36 displaces the ball upwardly to an open condition for dispensing a localized charge of glue onto the material. The valves 52 are distributed in the same pattern as punches 28, as seen in Fig. 6, in order that the glue may be applied to only those portions of the material that are to be ultimately punched out as disks.

Header 50 is bodily movable between a lowered condition in which the various balls 55 of valves 52 are opened by engagement with material 36 and an upwardly retracted condition away from the material. The header is guided for such movement by a pair of elongated lugs 57 depending from the opposite ends of the header and slidably received within guide openings 58 in the work supporting portion 16 of the frame. Leaf springs 59, mounted to the underside of portion 16 of the frame, engage the lower ends of lugs 57 to normally urge the glue dispensing unit 13 upwardly to its retracted position. The glue dispensing unit is so positioned relative to the punching mechanism that each of the individual valves 52 engages material 36 at a location spaced from the corresponding one of the punches 28 a distance equal to an even multiple of the material advancement distance d (Fig. 6). Such spacing assures that the deposited glue spots will be positioned centrally on the discs ultimately punched.

The actuating mechanism 60 for operating the glue dispensing unit (see Figs. 1 and 8) includes a disk 61 rotatably carried by a shaft 62 which projects outwardly from punch holder 18. This disk has a number of threaded openings 63 spaced equally about its axis of rotation and within which a number of screws 64 are threadedly connectable. Screws 64 project axially outwardly from disk 61 and are adapted, in different predetermined rotative positions of the disk to engage and actuate the glue dispensing unit. For this purpose, header 50 carries at its center an upwardly projecting screw 65 whose head is engageable by a lowermost one 64a of the screws 64 upon downward movement of the punch holder carrying disk 61, to thus effect the desired downward movement of the glue dispensing unit.

During each cycle of the punch press, disk 61 is rotated through an angular distance corresponding to the spacing between successive openings 63 of the disk. For instance, after punch holder 61 has been once moved downwardly from its Fig. 8 position to bring the lowermost screw 64a into engagement with screw 65 and thus actuate the glue dispensing unit downwardly against material 36, disk 61 is automatically rotated in a clockwise direction through an angular distance sufficient to bring the opening designated 63a into the original lowermost position of screw 64a. Upon the next downward actuation of the punch holder, the glue dispensing unit is not actuated, since no screw is carried within opening 63a. When a laminated disk of four plies such as that shown in Fig. 2 is desired, the screws 64 are positioned about disk 61 in the sequence shown, there being three screws within successive openings 63, then an opening without a screw, then three screws within the next three successive openings, and so forth.

To effect the intermittent rotary advancement of disk 61, I provide a ratchet driving mechanism including an arm 66 adapted to swing about shaft 62 and carrying a spring pressed pawl 67 successively engageable within notches 68 in the outer edge of disk 61. The outer end of arm 66 is pivotally mounted to the lower end of rod 69 whose upper end is fixed to the punch press frame at 70. Thus, upon upward movement of the punch holder and disk 61, arm 66 and pawl 67 swings relatively downwardly by virtue of their connection to the substantially stationary rod 69, to thus advance disk 61 in a clockwise direction as seen in Fig. 8 through an angular distance corresponding to the spacing of openings 63. Upon subsequent downward movement of the punch holder, arm 66 and pawl 67 are retracted in a counterclockwise direction about disk 61 to a location in which pawl 67 is engaged within the next successive notch 68 of the disk. A detent element 71 is urged into notches 68 in the disk by a spring 72 and acts to position the disk during its downward stroke. Pawls 71 and notches 68 are straighter at one side than the other to permit clockwise advancing rotation of disk 61 while preventing counterclockwise movement. The nose of pawl 67 is similarly shaped to actuate the disk in a clockwise direction while being relatively movable from a notch and about the disk in a counterclockwise direction.

Glue or other adhesive is supplied to header 50 from a suitable container 73 through a supply line 74. A pump 75 may be connected into line 74 to place the glue supplied to header 50 under pressure.

In operation, motor 25 continuously drives fly wheel 24 and shaft 23. By virtue of link 48, shaft 23 drives rollers 37 and 38 through the ratchet drive 44, 45, 46 to intermittently advance material 36 through the machine. During each revolution of shaft 23, rollers 37 are rotated through an angle sufficient to advance the material the distance d of Fig. 6, and are then stationary for a predetermined interval while driving pawl 46 is retracted about ratchet wheel 44 in preparation for the next advancing actuation.

While pawl 46 is thus being retracted and rollers 37 and 38 are stationary, punch holder 18 is actuated downwardly by connecting rod 21 so that each of the punches 28 passes through the material 36 to the condition of Fig. 7. As the punch holder moves downwardly, the lowermost one 64a of the screws 64 on disk 61 engages screw 65 of the glue dispensing unit to actuate the glue dispensing unit downwardly and against material 36. Upon engagement with material 35, each of the ball valves 55 is automatically opened to dispense a predetermined charge of glue 80 on the upper surface of the material. The punch holder then commences its upward stroke, during which the ratchet drive 66, 67 effects rotary advancement of disk 61 to its next successive rotary position, and during which mechanism 11 acts to advance material 36 through the distance d in readiness for the next punching and glue dispensing stroke.

As the machine operates, it thus acts to deposit glue at predetermined locations 80 on the sheet of material 36 and to then punch disks from the material at those locations. The disks successively formed by any one punch 28 pass downwardly into the corresponding tube 14 within which they are retained in stacked relation by virtue of the constriction of the lower end of that tube. As the disks pass downwardly through tube 14 upon continued operation of the machine, the glue between successive disks dries to integrate them into a laminated spacer. If the arrangement of screws 64 is as shown in Fig. 8 the glue will be omitted from every fourth one of the disks, so that the disks will be glued together in groups of four to thus form four layer spacers of the type shown in Fig. 2. When it is desired that the spacers comprise a number of plies other than four, the screws 64 are rearranged on disk 61, or if necessary a different disk is substituted, to provide for the dispensing of glue upon successive disks in the proper sequence. For instance, if a six layer spacer of the type shown in Fig. 3 is desired, the screws 64 are so positioned about disk 61 that five successive openings 63 contain screws, the next one does not contain a screw, and then the same sequence is repeated.

Fig. 5 represents the perforated sheet of waste material which is left from the strip 36 after it passes through the machine. The thickness of the sheet as shown in Fig. 5 is represented at T3. The minimum width of the material between adjacent punchings is represented at T3'. In accordance with known punching principles, the dimension T3' must be at least as great as the dimension T3 in order to assure proper formation of the punched disks. Thus, by using a relatively thin sheet of material as shown in Fig. 5, it is possible to punch a large number of disks from a sheet while leaving a relatively narrow strip of waste material between the adjacent punchings.

Fig. 4 represents the conventional practice, according to which the amount of material wasted is considerably greater than under the present invention. Specifically, it has heretofore been the practice to form a laminated sheet of several plies of material, such as that shown in Fig. 4, prior to the punching operation, and to then punch completely through this laminated sheet to produce the desired spacer. As will be readily appreciated, this process results in considerably more waste, since the width of material T2' between adjacent punchings must be at least as great as the overall thickness T2 of the laminated sheet. A further highly important advantage of the present method over any process in which the sheets are glued together prior to the punching operation resides in the fact that such a laminated sheet cannot be handled in roll form, with the result that several flat sheets must be individually fed to the machine where a single roll is employed by the present method.

Fig. 11 illustrates a variational form of the invention identical to the first form except as to the manner of application of the glue to the sheet material. Specifically, in the Fig. 11 form, I substitute for the upper material feeding roller 38 of Fig. 10 a roller 38a having a number of projections 85 spaced in correspondence with the punches and acting to themselves engage and deposit glue on the material at the desired locations. These projections receive their glue from a second roller 86, which receives its glue from a supply pan 87 in which it rotates.

I claim:

1. Apparatus for forming laminated spacers for furring nails comprising punching mechanism to which a sheet of material is fed along a path and operable to successively punch a plurality of discs from said sheet, mechanism positioned along the path of said material to said punching mechanism and operable to apply adhesive to the portions of the sheet from which said discs are to be formed, means for actuating said adhesive applying mechanism in predetermined timed relation to said punching mechanism and in repeating cycles during each of which adhesive is applied to the portions of the material from which a predetermined number of said discs are to be successively punched and then omitted from the portion from which the next successive disc is to be punched, and a tube extending downwardly beneath said punching mechanism and through which said elements are directed in stacked relation after being punched, said tube having a lower longitudinally slit and resiliently expansible portion of a normal internal diameter slightly less than said discs to retard their passage through the tube and maintain them in said stacked relation as the adhesive dries.

2. Apparatus for forming laminated members comprising mechanism for successively punching a plurality of similarly shaped separate flat elements from a sheet of material, means operable in predetermined timed relation to said punching mechanism to intermittently advance said material along a path and to the punching mechanism, an adhesive applying unit positioned along the path of said material to the punching mechanism and mounted for movement toward and away from a position of engagement with the material, said unit including a valve operable by engagement with the material to discharge adhesive onto the material, means for actuating said adhesive applying unit into and out of engagement with the material in predetermined timed relation to said punching mechanism, and means for retaining said elements together in stacked relation after being punched so that the adhesive integrates them into a laminated member.

3. Apparatus for forming laminated members comprising mechanism for successively punching a plurality of similarly shaped separate flat elements from a sheet of material, means operable in predetermined timed relation to said punching mechanism to intermittently advance said material along a path and to the punching mechanism, an adhesive applying unit positioned along the path of said material to the punching mechanism and mounted for movement toward and away from a position of engagement with the material, said unit including a valve operable by engagement with the material to discharge adhesive onto the material, means for actuating said adhesive applying unit into and out of engagement with the material in predetermined timed relation to said punching mechanism and in repeating cycles during each of which portions of the material from which a predetermined number of elements are to be successively punched and then omitted from the portion from which the next successive element is to be punched.

4. Apparatus for forming laminated spacer discs for furring nails comprising mechanism for successively punching a plurality of substantially identical discs from a sheet of material and including a punch holder movable toward and away from the material, means operable in predetermined timed relation to said punch holder to intermittently advance said material along a path and to the punching mechanism, an adhesive applying unit positioned along the path of said material to the punching mechanism and mounted for reciprocation toward and away from a position of engagement with the material, means yieldingly urging said unit away from the material, said unit including means operable by engagement with the material to locally deposit adhesive onto the portions of said material from which said discs are to be punched, an element rotatively mounted to the punch holder for bodily movement therewith and operable to actuate said adhesive applying unit into engagement with the material, means for rotatively advancing said element through a predetermined angle in response to each actuation of the punch holder, said rotary element having portions spaced about its axis and successively movable by said rotation of the element into active positions in which they engage and actuate the dispensing unit during punching actuation of the punch holder, said portions of the rotary element being so spaced as to engage and actuate the dispensing unit in a predetermined number of successive rotary positions of the element and then omit the actuation of said unit in the next successive position of the element, and means for retaining said discs together in stacked relation after being punched so that the adhesive upon drying forms them into a laminated spacer.

5. Apparatus for forming laminated members comprising punching mechanism to which a sheet of material is fed along a path and operable to successively punch a plurality of similarly shaped separate flat elements from said sheet, a rotatable roller-like member extending across the path of said material to said punching mechanism in engagement with the material, said roller-like member having a projection for carrying adhesive and engageable with the material to locally deposit said adhesive onto the portions of the material from which said elements are to be punched, means for feeding adhesive to said projection, and means for retaining said elements together in stacked relation after their formation so that the adhesive integrates them into a laminated member.

6. Apparatus for forming laminated members comprising mechanism for punching a plurality of flat separate elements from sheet material, a unit operable to apply liquid adhesive to said elements, a container for holding a supply of said adhesive and comunicating with said unit for delivery of adhesive thereto, a pump connected into the line between said container and unit for delivering the adhesive to the unit under pressure, and means for retaining said elements together in stacked relation after their formation so that the adhesive integrates them into a laminated member.

7. Apparatus for forming laminated members comprising intermittently operating punching mechanism adapted upon each operation to simultaneously punch from a sheet of material a plurality of flat separate elements arranged in a predetermined pattern, means operable to apply adhesive to said material at a plurality of local areas from which said elements are formed and arranged in correspondence with said punching pattern, means for actuating said punching mechanism and said adhesive applying means in predetermined timed relation, and means for retaining corresponding elements of successively punched patterns in stacked relation so that the adhesive integrates them into laminated members.

8. The method of forming a laminated member of the character described that includes locally applying adhesive to different portions of a sheet of material, punching a plurality of separate similarly shaped flat elements from said portions of the sheet and each after the application of adhesive to that portion, and holding said elements together in stacked relation after their formation so that the adhesive integrates them into a laminated member.

9. The method of forming laminated spacers for furring nails that comprises intermittently advancing a sheet of material along a path, locally applying adhesive to a plurality of different portions of said sheet, and successively punching from said sheet after the application of said adhesive and between the intermittent advancing movements of the sheet a plurality of separate substantially identical discs, said discs being punched in repeating cycles according to which a predetermined number of the successive discs are punched from said portions of the sheet to which adhesive has been applied and the next successive disc is punched from a portion of the sheet free of adhesive, and then holding said discs together in stacked relation and in the order in which they are punched so that the adhesive integrates them into laminated spacers.

10. Apparatus for forming laminated members comprising mechanism for successively punching a plurality of similarly shaped separate flat elements from a sheet of material, means operating in predetermined timed relation to said punching mechanism to progressively advance said material along a path and to the punching mechanism, adhesive applying means including a moving element and operating in timed relation to the advancement of said material to apply adhesive locally to the portions of said material from which some of said elements are punched, and a guide unit containing a guide-way through which said successively punched elements are directed in stacked relation and with said adhesive therebetween after being punched, said guide unit including means resisting the passage of said elements through said guide way to retain them in said stacked relation so that the adhesive upon drying integrates them into a laminated member.

11. Apparatus as recited in claim 10, in which said punching mechanism includes a pair of relatively movable punch elements one of which engages the side of said material to which said adhesive is applied and is relieved away from the material at the location of said adhesive to avoid engagement therewith.

12. Apparatus as recited in claim 10, in which said punching mechanism forms said elements into circular discs, and said guide unit comprises a tube extending downwardly beneath said punching mechanism and having a lower longitudinally slit and resiliently expansible portion of a normal internal diameter slightly less than said discs to retard their passage through the tube.

13. Apparatus as recited in claim 10, in which said adhesive applying means and said punching mechanism are so constructed and relatively timed as to operate in repeating cycles during each of which adhesive is applied to the portions of the material from which a predetermined number of said elements are successively punched and then omitted from the portion from which the next successive element is punched whereby the elements form laminated members of a predetermined number of plies.

14. Apparatus as recited in claim 10 in which said adhesive applying means is positioned along the path of said material to said punching mechanism to apply said adhesive before the punching operation.

15. Apparatus for forming laminated spacers for furring nails comprising mechanism for successively punching a plurality of circular discs from a sheet of material, means operating in predetermined timed relation to said punching mechanism to intermittently advance said material along a path and to the punching mechanism, adhesive applying means positioned along said path including a movable element and operating in timed relation to the advancement of said material to apply adhesive only locally to a side of said sheet of material at the centers of the portions thereof from which some of said discs are to be formed, said punching mechanism including a circular punch element located at said side of the material and centrally recessed away from said material to avoid engagement with said adhesive, and a guide unit containing a guide-way through which said discs are directed in stacked relation after being punched, said guide unit including means resisting the passage of said discs through said guide-way to retain them in said stacked relation so that the adhesive upon drying integrates them into laminated members, said adhesive applying means and punching mechanism being so constructed and relatively timed as to operate in repeating cycles during each of which adhesive is applied to the portions of the material from which a predetermined number of said discs are to be successively punched and is then omitted from the portion from which the next successive disc is to be punched, whereby the discs are integrated into laminated members of a predetermined number of plies.

16. Apparatus as recited in claim 15 in which said adhesive applying means are positioned along the path of said material to said punching mechanism to apply said adhesive before the punching operation, and in which said guide unit comprises a tube extending downwardly beneath said punching mechanism and having a lower longitudinally slit and resiliently expansible portion of a normal internal diameter slightly less than said discs to retard their passage through the tube.

EDWARD M. PARKER.

REFERENCES CITED

The following references are of record in the file of this patent:

UNITED STATES PATENTS

| Number | Name | Date |
|---|---|---|
| 880,121 | Bolton | Feb. 25, 1908 |
| 1,157,355 | Wolfe et al. | Oct. 19, 1915 |
| 1,548,052 | Maranville | Aug. 4, 1925 |
| 1,831,065 | Frederick | Nov. 10, 1931 |
| 1,839,889 | Palais | Jan. 5, 1932 |
| 2,029,922 | Heckel et al. | Feb. 4, 1936 |
| 2,288,972 | Millenaar | July 7, 1942 |
| 2,402,176 | Marks | June 18, 1946 |
| 2,482,981 | Kamrass | Sept. 27, 1949 |
| 2,488,685 | Riddle | Nov. 22, 1949 |
| 2,566,249 | Rainey et al. | Aug. 28, 1951 |